United States Patent [19]
Burns et al.

[11] Patent Number: 5,619,364
[45] Date of Patent: Apr. 8, 1997

[54] DEPOLARIZED SOURCE FOR HIGH POWER OPERATION OF AN INTEGRATED OPTICAL MODULATOR

[75] Inventors: William K. Burns, Alexandria, Va.; Marta M. Howerton, Bowie, Md.

[73] Assignee: The United States of America as represented by the Secretary of the Navy, Washington, D.C.

[21] Appl. No.: 392,310

[22] Filed: Feb. 22, 1995

[51] Int. Cl.$^6$ .............................. G01B 9/02; H01S 3/10; G02B 6/10
[52] U.S. Cl. .............................. 359/246; 359/281; 385/3
[58] Field of Search .............................. 359/246, 281; 385/3, 11; 369/110

[56] References Cited

U.S. PATENT DOCUMENTS

| | | | |
|---|---|---|---|
| 4,560,246 | 12/1985 | Cotter | 359/246 |
| 4,968,110 | 11/1990 | Bulmer et al. | 359/281 |
| 5,104,222 | 4/1992 | Kersey et al. | 356/345 |
| 5,200,964 | 4/1993 | Huber | 385/11 |
| 5,291,266 | 12/1994 | Burns et al. | 359/246 |

FOREIGN PATENT DOCUMENTS

| | | |
|---|---|---|
| 5289125 | 11/1993 | Japan. |
| 7092510 | 7/1995 | Japan. |

OTHER PUBLICATIONS

Howerton et al, OFC '94, vol. 4, Feb. 20, 1994, Optical Soc. of America, pp. 285–286, Abst only herewith.
Howerton et al, IEEE Photonics Technol. Lett., vol. 6, #1, pp. 115–117, Jan. 1994, abst. only herewith.
A.D. Kersey et al., Single Mode Fiber Pseudo–Depolarizer, SPIE vol. 838, Fiber Optic and Laser Senors V, at p. 360 (1987).
M.M. Howerton et al., Depolarized Source for High Power Remote Operation of an Integrated Optical Modulator, IEEE Photonics Technology Letters, vol. 6 (No. 1) [PTL] (1994) at p. 115. [Howerton et al. (PTL).].
M.M. Howerton et al., Depolarization Source for High–Power Operation of a Remote Waveguide Modulator, Optical Fiber Communication '94 [OFC '94], vol. 4 (Optical Society of America, Feb. 20-25, 1995) at p. 285.
D. Cotter, Suppression of Stimulated Brillouin Scattering During Transmission of High–Power Narrowband laser Light in Monomode Fibre, Electronics Letters, 18, 638 (No. 15, 1982).
D. Cotter, Stimulated Brillouin Scattering in Monomode Optical Fiber, Journal of Optical Communications 4, 10 (1983).
A.D. Kersey et al., Monomode Fibre Polarization Scrambler, Electronics Letters, 23, 634 (No. 12, 1987).
F. Heismann et al., Electrooptic Polaraization Scramblers for Optically Amplified Long–Haul Transmission Systems, IEEE Photonics Technology Letters, 6, 1156 (No. 9) (1994).
Letter dated Dec. 29, 1994, from IEEE Customer Service Center (per TerryAnne Gagliano) to Naval Research Laboratory (per Miles) re document AB, above.
Letter dated Dec. 29, 1994, from the Mack Publishing Group, Easton Division (per Karen Miller) to Naval Research Laboratory (per Miles) re document AB, above.

*Primary Examiner*—Nelson Moskowitz
*Attorney, Agent, or Firm*—Thomas McDonnell; Edward F. Miles

[57] ABSTRACT

A method and apparatus for counteracting polarization fading and stimulated Brillouin scattering in long runs of non-polarization maintaining optical fiber. A linearly polarized optical signal is depolarized by phase modulating the signal at a frequency significantly above the fiber's Brillouin scattering linewidth $V_b$ prior to launch into the long run of fiber.

14 Claims, 2 Drawing Sheets

5,619,364

DEPOLARIZED SOURCE FOR HIGH POWER OPERATION OF AN INTEGRATED OPTICAL MODULATOR

BACKGROUND OF THE INVENTION

Remote operation of integrated optical modulators for sensor applications or antenna remoting requires a definite polarization input to the guided-wave device. The stability of the state of polarization of the light is important in determining system performance, because many integrated optic devices exhibit a strong polarization sensitivity, and thus require a certain input state of polarization to operate at maximum efficiency. This problem has been dealt with by the use of polarization maintaining fiber, polarization control devices, or by the use of a depolarized source. In the latter case, the laser source is followed by ordinary (i.e. less expensive non-polarization maintaining) fiber and a polarizer which selects the state of polarization from the depolarized signal which the remote device needs for operation. For example, Kersey et al. have proposed phase modulating an optical signal having TE and TM modes, with a time varying modulation signal of about 100 kHz, the result of which was to differentially phase shift the TE and TM modes, effectively scrambling the signal's polarization and producing a de facto depolarized signal. See, Single-Mode Fiber Pseudo-Depolarizer, SPIE vol. 838, *Fiber Optic and Laser Sensors V*, p. 360.

Additionally, such remote operation must also avoid stimulated Brillouin scattering, which can occur when a long fiber is used with a high-power, narrow-linewidth, source. Brillouin scattering is a three-wave interaction process, in which the optical pump wave creates an acoustic wave in the fiber, which in turn scatters the pump wave into a third wave which travels backwards towards the pump. For significant stimulated Brillouin scattering to occur, the laser field must build up a strong coherent wave within the dephasing time of the acoustic signal, $V_b^{-1}$. But if optical phase reversals occur more frequently than spontaneous acoustic dephasing, then the acoustic wave is unable to build up to a large amplitude, and stimulated Brillouin scattering gain is smaller. See, D. Cotter, Suppression of Stimulated Brillouin Scattering During Transmission of High-Power Narrowband Laser Light in Monomode Fibre, *Electronics Letters*, 18, 638 (No. 15, Jul. 22, 1982). Cotter's paper reports reduction in Brillouin scattering when two signals having closely separated frequencies are launched into a optical fiber. The signals beat together to induce phase reversals which reduced simulated Brillouin scattering.

SUMMARY OF THE INVENTION

Accordingly, an object of the invention is provide a depolarized source of optical power useable for remote sensing, particularly of remotely sensed microwave signals.

Another object is to provide such a source of optical power which is resistant to Brillouin scattering.

In accordance with these and other objects made apparent hereinafter, the invention concerns an optical system, in which a laser is adapted to excite TE and TM modes in an optical phase modulator, which in turn phase modulates the TE and TM modes according to a selected modulating input, and launches the phase modulated output into an optical fiber. The phase modulator is effective to phase modulate at a frequency greater than $\Delta V_b$, where $\Delta V_b$ is the Brillouin scattering linewidth of the optical fiber. Because the modulation frequency is greater than $\Delta V_b$, the power level at which stimulated Brillouin scattering commences is raised, thus raising the net optical power deliverable to downstream devices. If $\Delta V_b$ is also significantly higher than the response time of downstream devices, these devices will see an effectively depolarized signal, thus eliminating the risk of polarization fading, and eliminating the need for long runs of expensive polarization maintaining optical fiber.

These and other objects are further understood from the following detailed description of particular embodiments of the invention. It is understood, however, that the invention is capable of extended application beyond the precise details of these embodiments. Changes and modifications can be made to the embodiments that do not affect the spirit of the invention, nor exceed its scope, as expressed in the appended claims. The embodiments are described with particular reference to the accompanying drawings, wherein:

DETAILED DESCRIPTION

Figure 1:
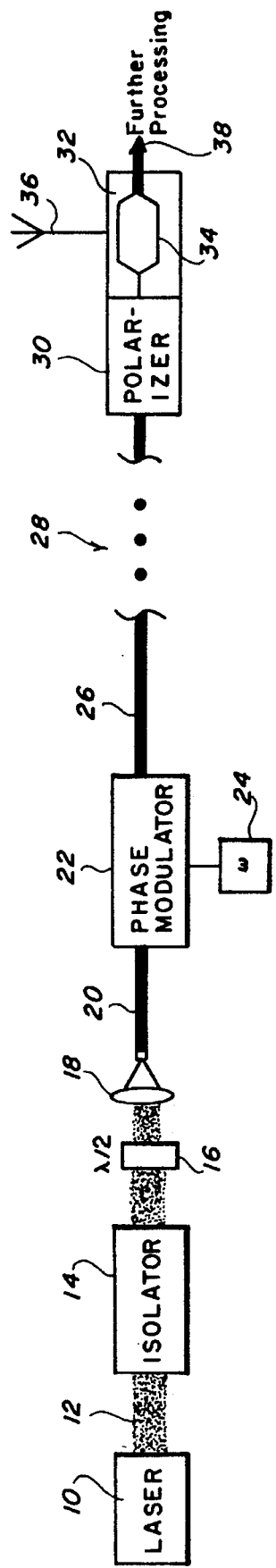
FIG. 1 is a schematic illustrating an embodiment according to the invention.

With reference to the drawing figures, FIG. 1 shows an embodiment according to the invention. Laser 10 generates an optical output 12, which is linearly polarized and operates at a single frequency. Light 12 traverses isolator 14, and half wave plate 16, to lens 18, the latter coherently focusing optical signal 12 onto a short length of polarization maintaining fiber 20. Isolator 14 prevents unwanted backreflections from interfering with laser 10's operations, and half wave plate 16 rotates the optical polarization of signal 12 so that it is aligned with one of the two principal axes of polarization maintaining fiber 20. Fiber 20 directs optical signal 12 to phase modulator 22, which phase modulates the optical signal 12 according to a modulation signal 24.

The axis of polarization maintaining fiber 20 must be rotated such that orthogonal (TE and TM) modes are excited equally at the input to phase modulator 22, which one can do by use of rotators, but more simply (and hence more preferably) by twisting fiber 20 to the appropriate orientation. Phase modulator 22 will phase shift the TE and TM modes differentially with respect to one another. By differentially phase shifting orthogonal polarization states of signal 12, one changes the effective state of polarization of signal 12 at the output of phase modulator 22. If one does this sinusoidally (i.e. modulation signal 24 is sinusoidal), one effectively transforms the state of polarization rotationally. If this rotation is at a critical modulation drive voltage, the effective degree of polarization can be reduced to zero, i.e. the signal is effectively de-polarized. If the frequency at which one phase modulates signal 12 is significantly higher than the operating frequency of devices downstream of phase modulator 22, such a device sees a signal which is effectively depolarized, in the manner taught by Kersey. For example, if optical signal 12 excites both TE and TM modes equally phase modulator 22, then the differential phase shift between the modes will be:

$$\phi_{TM} - \phi_{TE} = \phi_0 + \Delta\phi \sin(\omega t)$$

and will result in an effective polarization $P_{\mathit{eff}}$ of:

$$P_{\mathit{eff}} = \text{Absolute value}[J_0(\Delta\phi)]$$

where $\phi_{TM}$ and $\phi_{TE}$ are the respective phases of the transverse magnetic and transverse electric components of optical signal 12 after propagating through phase modulator 22, $J_0$ is the zero-th order Bessel function, $\phi_0$ is the mean differential phase difference between the TM and TE modes, and $\Delta\phi$ is the peak phase difference between the TM and TE modes. As an example, if modulator 24 is a z-cut modulator, then:

$$\Delta\phi = [(n_e^3 r_{33} - n_0^3 r_{13})/n_e^3 r_{33}]/(\pi V_0/V_{90})$$

where $n_e$ and $n_o$ are the extraordinary and ordinary indices of the fiber, $r_{33}$ $r_{13}$ are electrooptic coefficients, $V_\pi$ is the half-wave voltage of the TM mode, and $V = V_0 \sin(\omega t)$ is the drive voltage of modulator 24. By setting the equation for $\Delta\phi$ equal to any number which produces a zero of $J_0$ (e.g. 2.4 produces the first zero of $J_0$), one can calculate the drive voltage V for modulator 24 which produces a depolarized signal, as a function of $V_\pi$ for the TM mode.

Phase modulator 22 launches the depolarized signal onto non-polarization maintaining fiber 26, which carries the signal to a polarizer 30 distant from phase modulator 22. (Break 28 in fiber 26 on FIG. 1 is to illustrate that elements upstream and downstream of break 28 may be quite distant from one another, e.g. on the order of kilometers.) Polarizer 30 selectively passes the state of polarization needed by device 32. Although devices 32, 34 are illustrated separately on FIG. 2, they are preferably integrated into one device for simplicity.

In practice, phase modulator 22 can be any appropriate integrated optical device which permits phase modulation at a frequency above $V_b$, so as to resist stimulated Brillouin scattering, and preferably is one which can modulate effectively with a low drive voltage and low insertion losses. An electro-optic modulator fabricated in a lithium niobate (LiNbO$_3$) wafer, and having traveling wave terminals, is such a device, and permits phase modulation at frequencies significantly higher than 23 MHz, which is $V_b$ for silica fiber.

Member 32 could be any of a wide variety of electro-optical or mechanical-optical devices. Preferably member 34 can be a mixer for modulating a microwave signal from an antenna 36 onto the optical signal received from polarizer 30. Member 32 contains an integrated-optic Mach-Zehnder interferometer 34, for mixing a microwave signal received from antenna 36. The resultant modulated optical signal then is directed to station 38 for further processing, e.g. demodulation and interpretation of the microwave signal. Member 32 is preferably fabricated in Ti:LiNbO$_3$, which permits easy integration of members 30 and 32 into one wafer.

Figure 2:
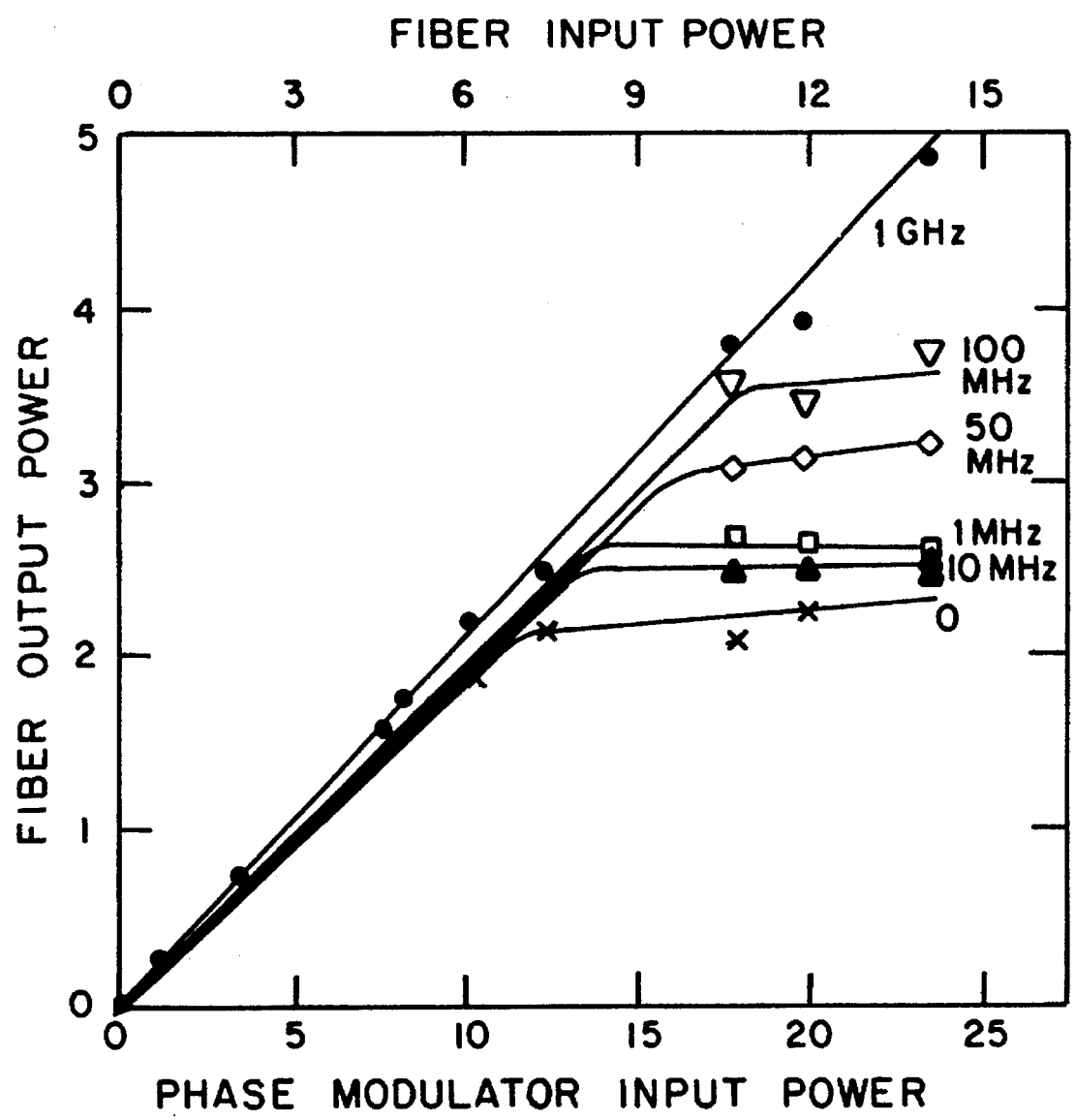
FIG. 2 is a graph of laboratory data illustrating reduction of Brillouin scattering by the invention.

A test was run using an experimental setup like that of FIG. 1, but without interferometer-mixer 32, 34, antenna 36, or processing station 38. Optical source 10 was a 40 mW diode-pumped Nd:YAG laser operating in the TEM$_{00}$ mode, at 1.3 µm wavelength. Phase modulator 22 was a z-cut Ti:LiNbO$_3$ integrated optical device, designed for broadband operation up to 40 GHz. The output of the phase modulator 22 was coupled to 10.5 km of ordinary (non-polarization maintaining) fiber. The results are shown in FIG. 2, which is a plot of fiber output power against the input power of phase modulator 22, with each curve being at a different phase modulation frequency. From the graph, one can see that the power level increases linearly until Brillouin scattering sets in, at which point transmitted power levels off, and that as one increases the modulation frequency one increases the power level at which Brillouin scatter commences. This is consistent with the results of Cotter, supra.

The invention has been described in what is considered to be the most practical and preferred embodiments. It is recognized, however, that obvious modifications to these embodiments may occur to those with skill in this art. Accordingly, the scope of the invention is to be discerned from reference to the appended claims.

We claim:

1. An optical system, comprising:

a laser system;

a phase modulator adapted to receive optical output of said laser system effective to stimulate in said phase modulator TE and TM modes, said phase modulator being further effective to differentially phase modulate said TE and TM modes in accordance with a selected modulation signal to produce a phase modulated output; and means for launching said phase modulated output into an optical waveguide;

wherein said phase modulator is effective to phase modulate said output at a frequency greater than $\Delta V_b$, where $\Delta V_b$ is the Brillouin scattering linewidth of said optical waveguide.

2. The system of claim 1, further comprising:

a polarizer;

a microwave input; and electro-optic modulating means;

wherein said optical waveguide is disposed effective to transmit said phase modulated output to said polarizer, said polarizer is effective to pass a component of said modulated output having a selected state of polarization to said electro-optic modulating means; and wherein said electro-optic modulating means is adapted to modulate microwaves received from said microwave input with said component of said modulated output effective to cause said component to be the carrier wave for said microwave input.

3. The system of claim 2, wherein said electro-optic modulating means is a Mach-Zehnder interferometer.

4. The system of claim 3, wherein said Mach-Zehnder interferometer is fabricated in a LiTaO$_3$ wafer.

5. A microwave antenna system, comprising:

an antenna adapted to receive microwaves;

an electro-optic modulator effective to modulate said microwaves onto an optical carrier;

a laser system a phase modulator adapted to receive optical output of said laser system effective to stimulate in said phase modulator TE and TM modes, said phase modulator being further effective to differentially phase modulate said TE and TM modes in accordance with a selected modulation signal to produce a phase modulated output;

means for launching said phase modulated output into an optical waveguide; and a polarizer;

wherein said optical waveguide is disposed effective to transmit said phase modulated output to said polarizer, said polarizer is effective to pass a component of said phase modulated output having a selected state of polarization to said electro-optic modulator to form said optical carrier; and wherein said phase modulator is effective to phase modulate said output of said light source at a frequency greater than $\Delta V_b$, where $\Delta V_b$ is the Brillouin scattering linewidth of said optical waveguide.

6. The system of claim 5, wherein said electro-optic modulator is a Mach-Zehnder interferometer.

7. The system of claim 6, wherein said Mach-Zehnder interferometer is fabricated in a LiNbO$_3$ wafer.

8. The system of claim 1, wherein said phase modulator is a lithium niobate wafer having traveling wave terminals.

9. The system of claim 5, wherein said phase modulator is a lithium niobate wafer having traveling wave terminals.

10. A method for producing an optical signal, comprising:

producing a laser signal;

using a phase modulator for phase modulating said laser signal effective to stimulate in said phase modulator TE and TM modes, said phase modulating being further effective to differentially phase modulate said TE and TM modes; and launching the phase modulated output produced by said step for using into an optical waveguide;

wherein said phase modulating is done at a frequency greater than $\Delta V_b$, where $\Delta V_b$ is the Brillouin scattering linewidth of said optical waveguide.

11. The method of claim 10, further comprising:

transmitting said phase modulated output in said optical waveguide to a polarizer;

using said polarizer to pass a component of said phase modulated output having a selected state of polarization; and modulating said selected component with a selected microwave signal effective to cause said component to be the carrier wave for said microwave input.

12. The system of claim 1, wherein said optical waveguide is an optical fiber.

13. The system of claim 5, wherein said optical waveguide is an optical fiber.

14. The method of claim 10, wherein said optical waveguide is an optical fiber.

* * * * *